United States Patent
Fotta

(10) Patent No.: US 10,339,398 B2
(45) Date of Patent: Jul. 2, 2019

(54) METHOD AND DEVICE FOR RECOGNIZING TRAFFIC SIGNS

(71) Applicant: Elektrobit Automotive GmbH, Erlangen (DE)

(72) Inventor: Martin Fotta, Erlangen (DE)

(73) Assignee: Elektrobit Automotive GmbH, Erlangen (DE)

(*) Notice: Subject to any disclaimer, the term of this patent is extended or adjusted under 35 U.S.C. 154(b) by 118 days.

(21) Appl. No.: 15/463,810

(22) Filed: Mar. 20, 2017

(65) Prior Publication Data
US 2017/0270377 A1 Sep. 21, 2017

(30) Foreign Application Priority Data
Mar. 21, 2016 (DE) .................. 10 2016 003 424

(51) Int. Cl.
G06K 9/00 (2006.01)
G05D 1/00 (2006.01)

(52) U.S. Cl.
CPC ....... *G06K 9/00818* (2013.01); *G05D 1/0088* (2013.01)

(58) Field of Classification Search
None
See application file for complete search history.

(56) References Cited

U.S. PATENT DOCUMENTS

| 4,620,286 | A  | * | 10/1986 | Smith      | G06K 9/62   |
|           |    |   |         |            | 700/5       |
| 8,223,038 | B2 | * | 7/2012  | Bauer      | G06K 9/3241 |
|           |    |   |         |            | 340/905     |
| 8,233,670 | B2 | * | 7/2012  | Moed       | G06K 9/00818|
|           |    |   |         |            | 382/100     |
| 8,643,721 | B2 |   | 2/2014  | Becker     |             |
| 9,070,293 | B2 |   | 6/2015  | Roeber et al. |          |
| 9,082,022 | B2 |   | 7/2015  | Huth       |             |
| 9,697,430 | B2 | * | 7/2017  | Kristensen | G06K 9/00818|
| 2010/0283855 | A1 | * | 11/2010 | Becker   | G06K 9/00818|
|           |    |   |         |            | 348/148     |
| 2011/0109476 | A1 | * | 5/2011  | Porikli  | G06K 9/00818|
|           |    |   |         |            | 340/905     |
| 2013/0322771 | A1 | * | 12/2013 | Poyil    | G06K 9/4647 |
|           |    |   |         |            | 382/203     |
| 2014/0193033 | A1 | * | 7/2014  | Huth     | G06K 9/00818|
|           |    |   |         |            | 382/103     |

(Continued)

FOREIGN PATENT DOCUMENTS

DE 102007021578 A1 11/2008
DE 102007021579 A1 11/2008
(Continued)

*Primary Examiner* — Delomia L Gilliard
(74) *Attorney, Agent, or Firm* — Cozen O'Connor

(57) ABSTRACT

A method for recognizing traffic signs includes: receiving images of traffic signs from different locations at different times; and calculating a first probability value that indicates the probability with which an image received at a specific time maps a specific traffic sign from a set of traffic signs. The calculating is based on: at least one image of a traffic sign received before the specific time and characterizing an earlier state, and a previously known transition probability value that indicates the probability with which the specific traffic sign occurs following the earlier state.

17 Claims, 7 Drawing Sheets

| Input state (location, speed) | Entry | Transition probability | Output state |
|---|---|---|---|
| Freeway, unlimited speed | ⚠ | P(Roadworks \| unlimited speed, freeway) | Freeway_roadworks, unlimited speed |
| Freeway_roadworks, unlimited speed | (80) | P(80 km/h \| unlimited speed, freeway_roadworks) | Freeway_roadworks, 80 km/h |
| Freeway_roadworks, 80 km/h | (60) | P(60 km/h \| 80 km/h, unlimited speed, freeway_roadworks) | Freeway_roadworks, 60 km/h |

(56) References Cited

U.S. PATENT DOCUMENTS

| | | | | |
|---|---|---|---|---|
| 2015/0071490 A1* | 3/2015 | Fukata | ............... | G06K 9/00791 |
| | | | | 382/103 |
| 2016/0275793 A1* | 9/2016 | Yokochi | ............. | G06K 9/00818 |
| 2017/0053167 A1* | 2/2017 | Ren | ..................... | G06K 9/00624 |
| 2017/0268896 A1* | 9/2017 | Bai | ........................ | G01C 21/36 |
| 2017/0308989 A1* | 10/2017 | Lee | ........................ | B60R 11/04 |
| 2018/0120857 A1* | 5/2018 | Kappauf | ................ | G01C 21/32 |

FOREIGN PATENT DOCUMENTS

| DE | 102007034505 A1 | 1/2009 |
|---|---|---|
| DE | 102011081456 A1 | 2/2013 |
| DE | 102012023022 A1 | 5/2014 |
| DE | 102013210725 A1 | 12/2014 |

\* cited by examiner

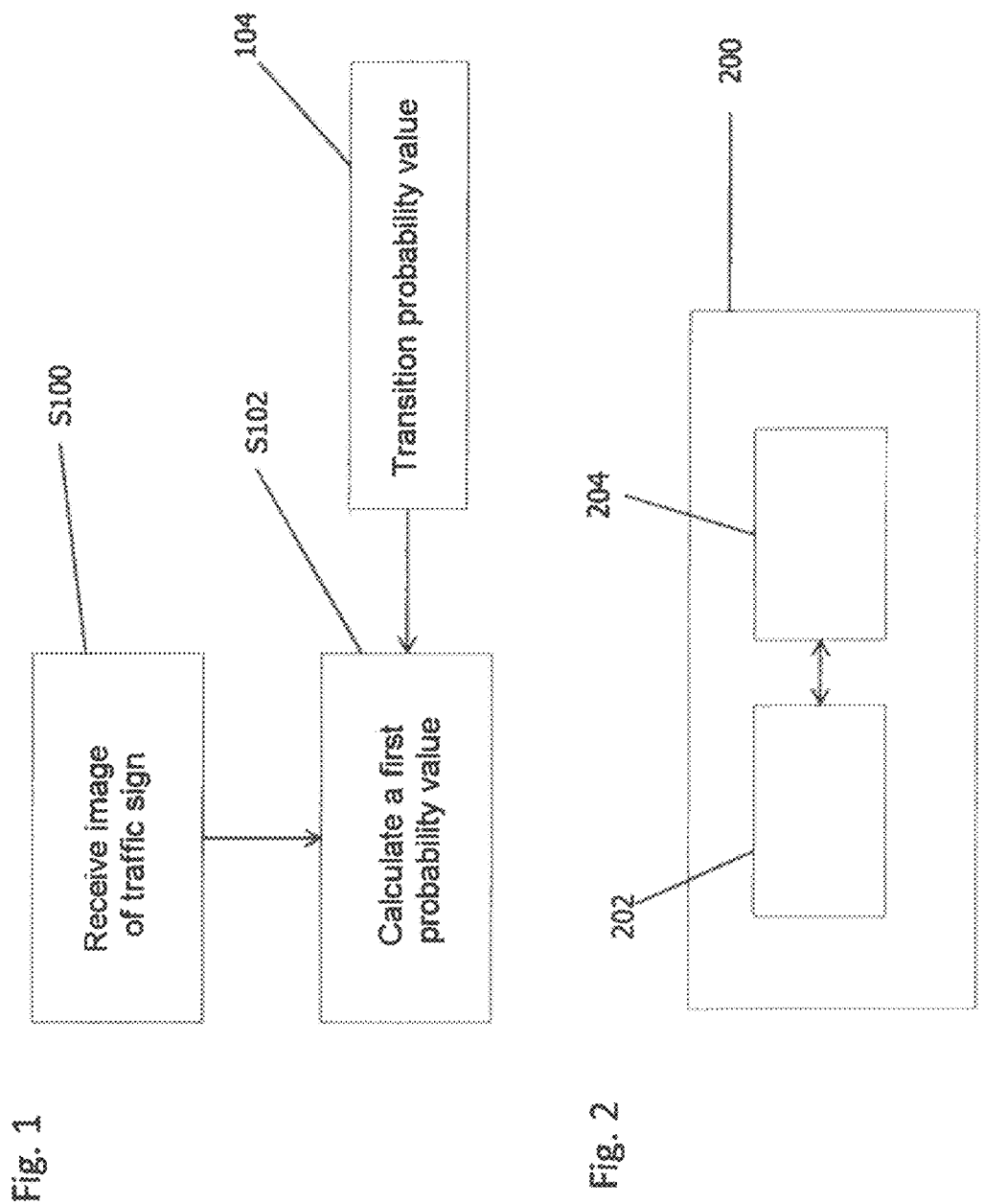

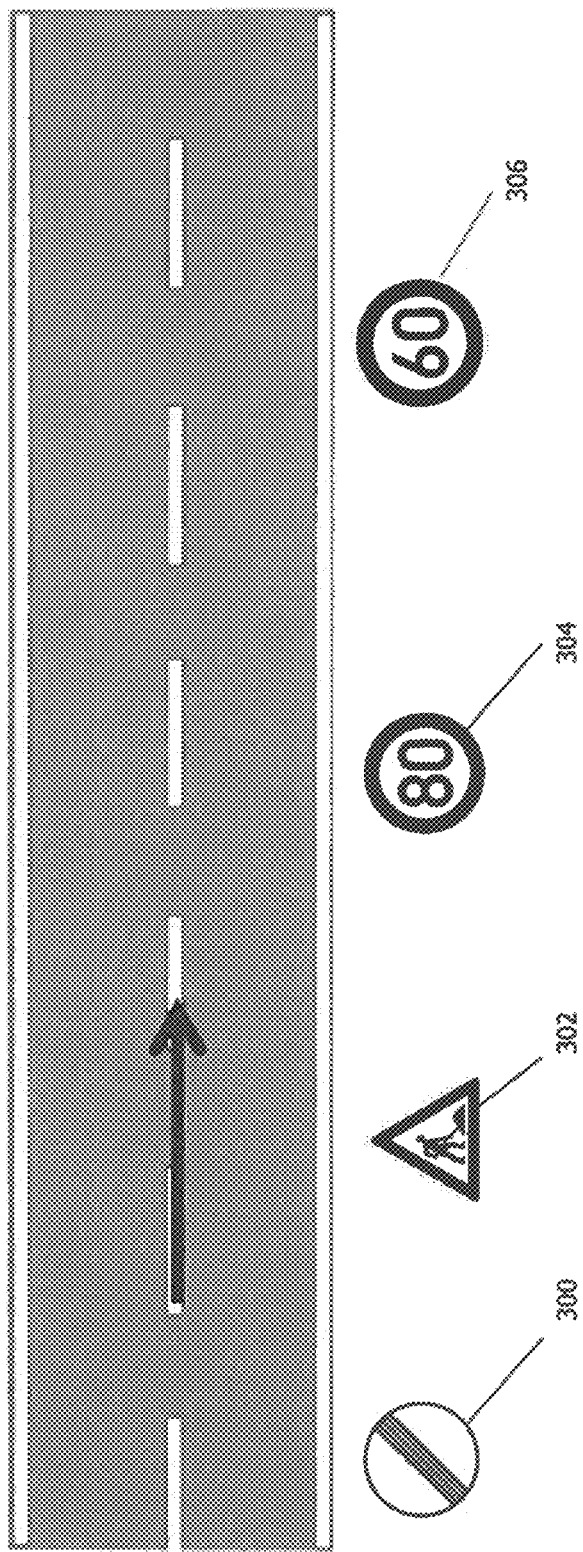

Fig. 4

| Input state (location, speed) | Entry | Transition probability | Output state |
|---|---|---|---|
| Freeway, unlimited speed | ⚠ | P(Roadworks \| unlimited speed, freeway) | Freeway_roadworks, unlimited speed |
| Freeway_roadworks, unlimited speed | 80 | P(80 km/h \| unlimited speed, freeway_roadworks) | Freeway_roadworks, 80 km/h |
| Freeway_roadworks, 80 km/h | 60 | P(60 km/h \| 80 km/h, unlimited speed, freeway_roadworks) | Freeway_roadworks, 60 km/h |

| Input state (location, speed) | Entry | Transition probability | Output state |
|---|---|---|---|
| Freeway_roadworks, 60 km/h |  | P(End of 60 km/h \| 60 km/h, 80 km/h, freeway_roadworks) | Freeway, unlimited speed |

Fig. 8

| Input state (location, speed) | Entry | Transition probability | Output state |
|---|---|---|---|
| Motor road, 100 km/h | Wilster | P(Place-name sign \| 100 km/h, motor road) | Built-up area, 50 km/h |
| Built-up area, 50 km/h | 30 | P(30 km/h \| 50 km/h, built-up area) | Built-up area, 30 km/h |

METHOD AND DEVICE FOR RECOGNIZING TRAFFIC SIGNS

BACKGROUND OF THE INVENTION

1. Field of the Invention

The present disclosure relates in general to the fields of driver assistance and autonomous driving. Specifically, a technique for recognizing traffic signs is indicated. The technique can be implemented as a method, as a device, or as a computer program.

2. Description of the Related Art

In Automatic traffic sign recognition is an essential feature of many vehicles. A wide variety of methods for recognizing traffic signs are conceivable in this connection.

In one method ("Traffic Sign Recognition"), the images of recorded traffic signs are allocated to a specific traffic sign class on the basis of specific characteristic features. A circular traffic sign, for example, can be allocated to a traffic sign that indicates a speed limit. On the basis of a feature which is class-specific to this specific traffic sign class, for example the number block in the case of speed limits, the recorded image can then be allocated to a specific traffic sign within this traffic sign class. The matching process outputs a result that indicates how reliably the recorded image indicates the specific traffic sign from the traffic sign class.

Visibility conditions, inter alia, are decisive for the reliability of a method of this type, which is based purely on the matching of class-specific features of image data with stored class-specific features. In poor visibility conditions, such as those caused by fog and rain, the risk exists of traffic signs within one class being confused with one another, for example the 30 km/h speed limit sign with the 130 km/h speed limit sign, or even the risk of traffic signs from different traffic sign classes being confused with one another, for example the 12t maximum weight limit sign with the 120 km/h speed limit sign. It is furthermore known for the rear lights of an automobile driving in front to be mistakenly recognized as the 60 km/h speed limit sign.

A different method ("Traffic Sign Fusion") is based on a combination of camera data with map data containing traffic sign information. The traffic sign recorded and recognized by the camera is compared with the traffic signs from the map data expected at the present position. In the event of a complete match, the corresponding traffic sign is output to the driver. In the event of an incomplete match, a higher or lower evaluation of the camera data can be carried out depending on the recognition probability and, as a result, either the camera data or the map data can be prioritized, or both data can be rejected.

Plausibility checks can be completed here through the application of defined acceptance criteria. For example, a traffic sign with a speed limit of 80 km/h is improbable within a built-up area, so that, in this case, the map data are prioritized. The definition and development of these hard-coded acceptance criteria are costly and time-consuming. In order to improve these acceptance criteria, they must be geared towards specific driving circumstances, which entails a substantial testing requirement. If no camera data are available, traffic signs known from a map are used, which are output to the driver without further verification.

SUMMARY OF THE INVENTION

In view of the foregoing issues, it is an object of the present invention to provide a technique for recognizing traffic signs that avoids one or more of the disadvantages of the prior art method.

According to one aspect, in carrying out the method, images of traffic signs are received at different times and a first probability value is calculated that indicates the probability with which an image received at a specific time maps a specific traffic sign from a set of traffic signs. The calculation is based on at least one image of a traffic sign received before the specific time and characterizing an earlier state, and a previously known transition probability value that indicates the probability with which the specific traffic sign occurs following the earlier state.

The calculation can be performed according to a hidden Markov model. According to this model, the recorded images correspond to the emissions that occur with certain probabilities depending on the state, here the real traffic signs, corresponding here to the first probability value. The states are characterized by the really occurring traffic signs from which images are received.

The images of traffic signs may be images of all occurring traffic signs. In addition to speed limits, the mapped traffic signs may therefore also indicate, for example, the driving environment, i.e., for example, place-name signs that indicate the start of a built-up area, and freeway signs and motor road signs that indicate the start of a freeway or motor road. The mapped traffic signs may furthermore indicate whether special circumstances prevail within a driving environment, for example whether roadworks, hazard locations or railroad crossings are present. It is thus highly improbable, for example, that only a permissible maximum speed of 30 km/h is allowed on a freeway without a different traffic sign, such as, for example, a sign indicating the start of roadworks, having previously occurred.

In one embodiment, a provisional probability value is defined before the calculation step, indicating the probability with which an image received at the specific time maps a specific traffic sign from a set of traffic signs, and, following the calculation step, a second probability value is calculated by weighting the provisional probability value for a specific traffic sign from the set of traffic signs with the first probability value for the specific traffic sign.

This embodiment represents a two-stage recognition method. In a first step, a provisional probability value is determined for the presence of a specific traffic sign. This provisional probability value can be defined using a conventional method for recognizing traffic signs. In a second step, a total probability value, i.e., the second probability value, is then calculated using the provisional probability value and the first probability value determined thereafter, in particular by weighting the provisional probability value with the first probability value. The reliability of the method can be improved as a result.

One possibility for a method for performing the first step is the method described above ("Traffic Sign Recognition") in which the images of recorded traffic signs are allocated to a specific traffic sign class on the basis of specific characteristic features and the recorded image is then allocated to a specific traffic sign within this traffic sign class on the basis of a feature which is class-specific to this specific traffic sign class. The matching process outputs a result, i.e., the provisional probability value indicating how reliably the recorded image indicates the specific traffic sign from the traffic sign class.

According to one variant, the first probability value can first be calculated in the calculation step for the specific traffic sign from the set of traffic signs for which the highest provisional probability value was defined in the preceding definition step. In this way, it is ensured that the traffic sign with the highest total probability value can be quickly defined.

In a further embodiment variant of this method, the specific traffic sign is then output from the set of traffic signs for which the highest second probability value was determined.

It is advantageous if the specific traffic sign from the set of traffic signs is output only if the second probability value determined for the specific traffic sign exceeds a predefined threshold value. It is thus ensured that only traffic signs are output for which it has been determined with sufficiently high reliability that they are mapped on the recorded traffic sign. The output may be an indication of the traffic sign, for example on an indication unit such as a display.

In one development of the method, the earlier state is characterized in the calculation of the first probability value by a traffic sign recognized by this method which maps the image recorded before the specific time. This means that the earlier state, which serves as the basis for the probability of transition to the new state, is characterized by the traffic sign that was recognized by this method at an earlier time before the specific time, on the basis of the received images of traffic signs.

In another development of the method, the first probability value is calculated on the basis of a sequence of traffic signs recognized by this method before the specific time, the traffic signs mapping the images recorded before the specific time and in each case characterizing an earlier state. This means that an entire sequence of earlier states is used to characterize the earlier state, which serves as the basis for the transition probability value for the transition to the new state. In particular, the traffic signs successively recognized in a driving environment, such as, for example, within a built-up area, are used to characterize the earlier state even if the new traffic sign to be defined occurs within the same driving environment.

In another variant, the previously known transition probability value is allocated to a sequence of traffic signs that map a real traffic event.

The database (e.g., a specific data structure) with the transition probabilities and the sequence of traffic signs can be created manually by observing a real driving environment and transferring the observed sequences of traffic signs into a database. The allocated transition probability value is then a measure of how frequently the sequence of traffic signs has been observed in the real driving environment. Alternatively, the sequence of traffic signs can be obtained from a digital map with traffic information preferably stored on an external server, so that the manual "training" of the database is no longer required. In one variant, the database corresponds to a transition matrix of a hidden Markov model and the values retrievable therefrom produce, for example, the observation matrix.

The recognized traffic sign may be output, for example, to a driver assistance system of a vehicle, so that, for example, if the maximum permissible speed limit is exceeded, a visual, audible or haptic warning signal is then output to the driver. In another aspect, the method is carried out in the context of autonomous driving of a vehicle.

According to another variant, a device for recognizing traffic signs is provided, having a processor configured so that the images of traffic signs are received at different times, and a first probability value is calculated that indicates the probability with which an image received at a specific time maps a specific traffic sign from a set of traffic signs. The calculation is based on at least one image of a traffic sign received before the specific time and characterizing an earlier state, and a previously known transition probability value which indicates the probability with which the specific traffic sign occurs following the earlier state.

The probability value determined by the device is independent from the visibility conditions. Furthermore, there is no longer any need to develop and define hard-coded acceptance criteria, since the acceptance or non-acceptance can be based entirely on the first probability value calculated according to the disclosed method.

The processor can be configured according to a hidden Markov model. According to this model, the recorded images correspond to the emissions that occur depending on the state, here the real traffic signs, with certain probabilities, here according to the first probability value. The states are characterized by the really occurring traffic signs of which images are received.

The images of traffic signs received by the device may have been previously recorded by a digital camera and forwarded to the device.

According to one variant, the device has a memory in which the previously known transition probability value and a sequence of traffic signs allocated to the transition probability value and mapping a real traffic event are stored.

According to one aspect, the device forms part of a driver assistance system of a vehicle, which then outputs a visual, audible or haptic warning signal to the driver, for example if the maximum speed limit is exceeded. Assistance systems of this type are also referred to as Advanced Driver Assistance Systems (ADAS).

The device may be installed in a vehicle (e.g., as an ADAS component and/or in an autonomously driving vehicle). The vehicle may be a rail vehicle or a road vehicle (e.g., a motor vehicle or truck).

According to a different aspect, a computer program is provided, having program code to carry out the disclosed method when the program runs on a computer. The computer program may be stored on a non-transitory computer-readable data medium (e.g., within an Electronic Control Unit, ECU, of the vehicle).

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further advantages and features of the disclosure can be found in the following description in conjunction with example embodiments, and in the drawings which are referred to below. In these drawings:

FIG. 1 shows schematically a flow diagram in which the individual steps for recognizing traffic signs according to one embodiment are shown;

FIG. 2 shows schematically a device for recognizing traffic signs;

FIG. 3 shows a first sequence of traffic signs according to a real driving environment on a freeway according to a first example;

FIG. 4 shows, in a schematic table, how the traffic signs of the first sequence of traffic signs from FIG. 3 are recognized according to the present method;

FIG. 8 shows, in a schematic table, how the second sequence of traffic signs from FIG. 7 is recognized according to the present method.

DETAILED DESCRIPTION OF THE PRESENTLY PREFERRED EMBODIMENTS

Figure 5:
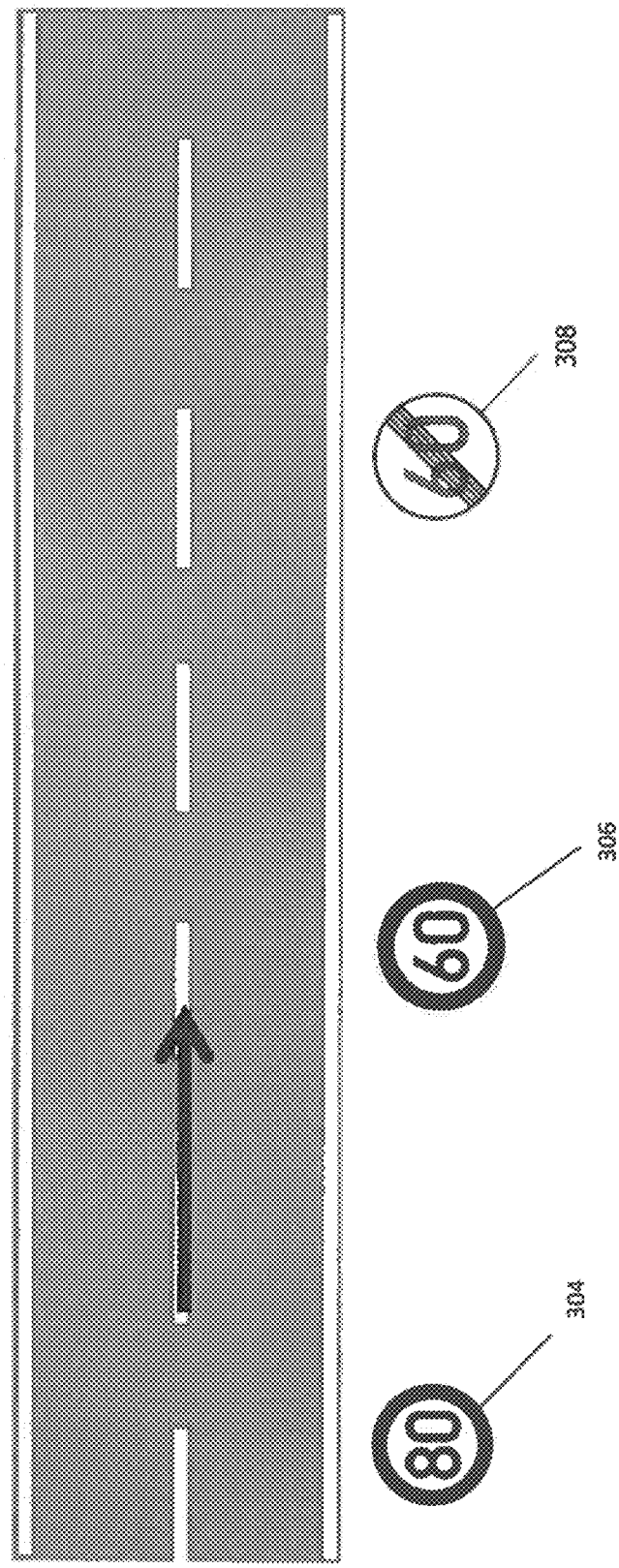
FIG. 5 shows an example of a real driving environment, indicating how the first sequence of traffic signs from FIG. 3 can be continued.

By the example embodiments described below, which can also be implemented in combination with one another, a method and a device for recognizing traffic signs are described by which the reliability of known methods and devices for recognizing traffic signs is increased.

FIG. 1 shows schematically a flow diagram of a method. In a first step S100, an image of a traffic sign is received. In a second step S102, a first probability value is calculated that indicates the probability with which an image received at a specific time maps a specific traffic sign from a set of traffic signs. This is performed on the basis of a previously known transition probability value 104 that indicates the probability with which the specific traffic sign occurs following an earlier state. The earlier state is characterized by at least one image of a traffic sign received before the specific time.

The traffic signs from the set of traffic signs may all be known traffic signs.

Depending on the amount of the first probability value, the specific traffic sign can then be output as a recognized traffic sign. The method can be carried out successively for different specific traffic signs from the set of traffic signs before one of the specific traffic signs is output as a recognized traffic sign.

Unlike methods known from the prior art, a traffic sign is therefore defined not only on the basis of the matching of image data with stored characteristic data of specific traffic sign classes or of specific traffic signs within this traffic sign class, but rather the reliability that a received image matches a specific traffic sign is defined on the basis of the preceding traffic event. The definition is performed, in particular, on the basis of the timeline of one or more previously received images of traffic signs which characterize(s) one or more earlier states. The previously known transition probability value is a measure of how probable it is that a specific traffic sign occurs following one or more previous traffic signs, and is therefore also a measure of how probable it is that a received image maps a specific traffic sign following the occurrence of one or more other traffic signs.

In contrast to the described conventional methods, the indicated method offers the advantage that the determined first probability value is less dependent on visibility conditions. Furthermore, it is no longer necessary to develop and define hard-coded acceptance criteria.

FIG. 2 shows schematically a device 200 to carry out the method. The device has a processor 202 and a memory 204. The calculation of the first probability value is carried out in the processor 202. The previously known transition probability values required for this purpose are stored in the memory 204. The received images of traffic signs can similarly be stored in the memory 204.

FIG. 3 shows a real driving environment event on a freeway, which is characterized by a sequence of traffic signs and a direction of movement from left to right. After a first traffic sign 300, which indicates the end of all route-related speed limits and overtaking bans, a second traffic sign 302 occurs, which is to be allocated to the class of general hazard signs and indicates a roadworks. This is followed by a third traffic sign 304, which indicates a speed limit, i.e., a maximum permissible speed of 80 km/h. Finally, a fourth traffic sign 306 can be seen which similarly indicates a speed limit, i.e., a maximum permissible speed limit of 60 km/h.

FIG. 4 shows a table on the basis of which it is explained below how the traffic signs of the first sequence of traffic signs from FIG. 3 are recognized according to the method. In the table, a state, i.e., the input state, the new entry, i.e., the newly received image of a traffic sign, the associated transition probability and the new output state are indicated in each case in the columns. In the examples shown here, a state is characterized in each case at least by the driving environment or the location and a further indication indicating the current permitted speed in this driving environment. It is thus evident in FIG. 4 that the first state, i.e., the input state, is defined by the "freeway" driving environment and the "unlimited speed" speed indication. The next traffic sign 302 that occurs shows the "roadworks". A recorded image of the "roadworks" traffic sign 302 is received. A first probability value is then calculated indicating the probability with that the received image maps a roadworks. The calculation is performed on the basis of a transition probability value that states how probable it is that the "roadworks" traffic sign 302 occurs following the state (freeway, unlimited speed). Since a roadworks on a freeway corresponds to a real driving environment, the transition probability value that is known is high. Consequently, the first probability value indicating how probable it is that the received image maps a roadworks is also high. Consequently, (freeway-_roadworks, unlimited speed) is defined as the new state, i.e., the state characterized by the driving environment of a roadworks on the freeway and an unlimited maximum permissible speed. This new output state can be output, for example to a driver assistance system of the vehicle. This state can be output if the first probability value exceeds a predefined threshold value. This state is furthermore the input state or the earlier state which is used to recognize a new traffic sign.

The next traffic sign 304 that occurs shows a maximum permissible speed limit of 80 km/h. A recorded image of the traffic sign 304 is received. The first probability value is next calculated once more, indicating how probable it is that the received image maps a traffic sign that allows a maximum permissible speed limit of 80 km/h. The calculation is again performed on the basis of a known transition probability value which how probable it is that the "maximum permissible speed limit of 80 km/h" traffic sign occurs after the (freeway_roadworks, unlimited speed) state. Since it corresponds to the real event on a freeway, wherein the maximum permissible speed limit is limited when a roadworks is present, the allocated transition probability value is high. Consequently, the first probability value indicating how probable it is that the received image maps a maximum permissible speed limit of 80 km/h is also high. (Freeway-_roadworks, 80 km/h) is defined as new state, i.e., the state characterized by a roadworks on the freeway as the driving environment and a maximum permissible speed limit of 80 km/h. This state can again be forwarded, for example, to a driver assistance system of a vehicle. Furthermore, this new, current state is again the input state or the earlier state which is used to recognize a new, subsequently following traffic sign.

A limit to a maximum permissible speed of 60 km/h follows as the next traffic sign 306. A recorded image of the traffic sign 306 is again received. The first probability value is again calculated, indicating how probable it is that the received image maps a traffic sign which allows a maximum permissible speed of 60 km/h. The calculation is again performed on the basis of a known transition probability value that states how probable it is that the "maximum permissible speed of 60 km/h" traffic sign occurs after the earlier sequence of states, i.e., the recognized traffic signs.

Specifically, in the example shown here, the earlier sequence of traffic signs represents the recognized or pre-defined traffic signs within a driving environment, i.e., the traffic signs occurring on the freeway. The "end of all route-related speed limits and overtaking bans" traffic sign was predefined in the input state, and may represent a traffic sign recognized by the present method before this described sequence. The roadworks have then been recognized as a special circumstance within the freeway as the driving environment, along with the traffic sign which shows a maximum permissible speed limit of 80 km/h.

Accordingly, the transition probability that is relevant here is the probability with which the speed limit to a maximum speed limit of 60 km/h occurs following a speed limit to a maximum speed limit of 80 km/h and an unlimited speed limit on the freeway as the driving environment with the special circumstance of a roadworks. Since a sequence of this type corresponds to a real event on the freeway, the allocated transition probability value is high. Consequently, the first probability, which states how probable it is that the received image maps a maximum permissible speed of 60 km/h, is also high. (Freeway_roadworks, 60 km/h) is therefore defined as the new state, i.e., the state characterized by a roadworks on the freeway as the driving environment and a maximum permissible speed of 60 km/h. This state can again be forwarded, for example, to a driver assistance system of a vehicle. Furthermore, this new current state, again the input state or the earlier state, can be used to recognize a new, subsequently following traffic sign, as shown, for example, in FIG. 5.

FIG. 5 shows a real driving environment event that may indicate the end of the roadworks on the freeway. In the example shown here, the 80 km/h and 60 km/h maximum speed limits 304, 306 shown in FIG. 3 are followed by a traffic sign 308 which indicates the end of the maximum permissible speed of 60 km/h.

Figure 6:
FIG. 6 shows, in a schematic table, how the traffic sign in the example from FIG. 5 is recognized according to the present method.

The input state shown in FIG. 6 is the last state shown in FIG. 4, i.e., the state characterized by the freeway as the driving environment with the roadworks as the special circumstance on the freeway and a speed limit to a maximum of 60 km/h. An image of the next traffic sign 308 according to FIG. 5, the end of the speed limit to 60 km/h, is received and transmitted. A first probability value is calculated, indicating the probability with which the received image maps the traffic sign 308, which ends the speed limit to a maximum of 60 km/h. The calculation is performed on the basis of a transition probability value which represents how probable it is that the "End of the maximum permissible speed limit of 60 km/h" traffic sign occurs after the traffic signs 304, 306, which limit the maximum speed to 60 km/h or 80 km/h within a roadworks on the freeway. Since it is customary at the end of a roadworks on a freeway to end the preceding speed limit, this scenario also corresponds to a real driving environment and the transition probability value allocated to this sequence of traffic signs or states is high. Consequently, the first probability value indicating how probable it is that the received image maps the traffic sign 306, which ends the maximum 60 km/h speed limit, is also high. (Freeway, unlimited speed) is defined as the new state, i.e., the state characterized by the freeway (without roadworks) as the driving environment and an unlimited maximum permissible speed. This state can again be output, for example to a driver assistance system of a vehicle.

Figure 7:
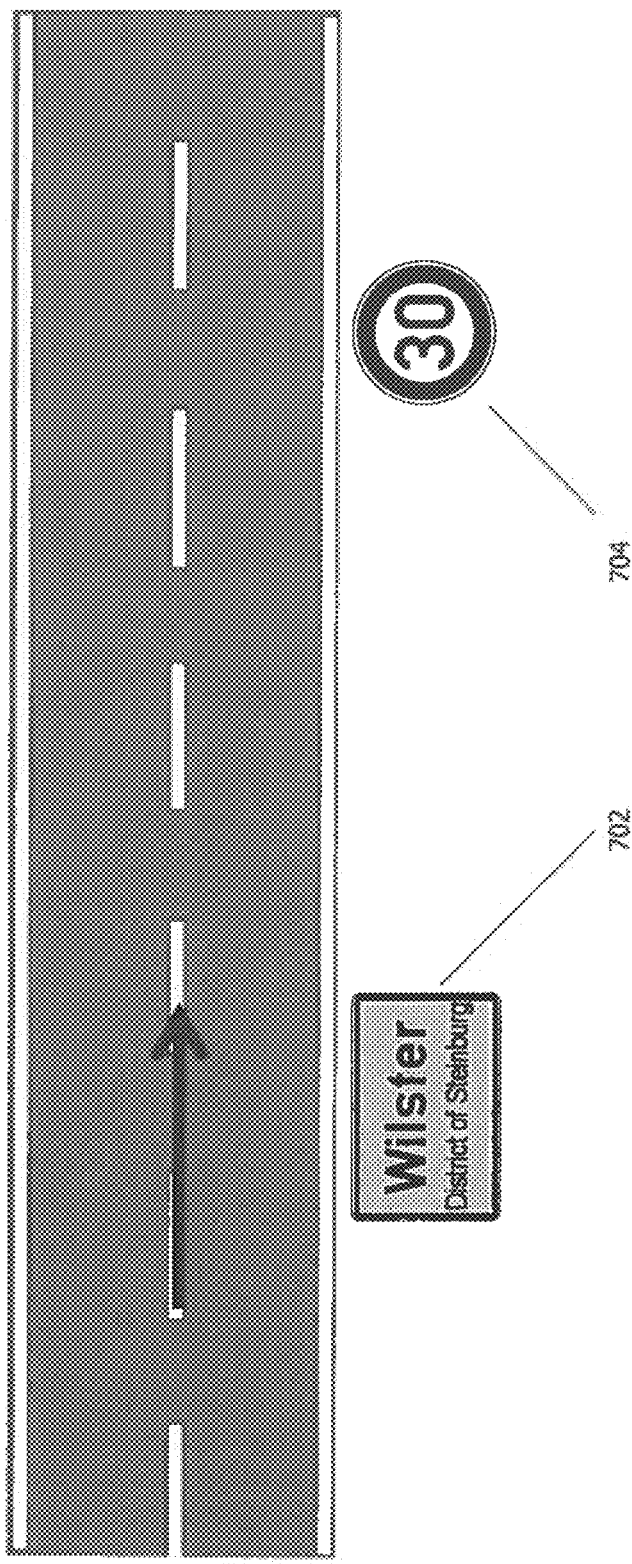
FIG. 7 shows a second sequence of traffic signs according to a real driving environment according to a second example.

FIG. 7 shows a real event at the entry to and within a built-up area. The entry to a built-up area is indicated with a place-name sign 702. A maximum speed limit of 50 km/h then applies within the built-up area. This is then limited by a further traffic sign 704 to a maximum of 30 km/h.

The input state shown in FIG. 8 is a rural road or motor road with a maximum permissible speed of 100 km/h. An image of the place-name sign 702 is received and transmitted. A first probability value is calculated, which indicates the probability with which the received image maps the place-name sign 702. The calculation is performed on the basis of a transition probability value that states how probable it is that the place-name sign 702 occurs on a motor road. Since this in turn maps a normal real event, the transition probability value allocated to this sequence of traffic signs or states is high. Consequently, the first probability value indicating how probable it is that the received image maps a place-name sign is also high. (Built-up area, 50 km/h) is defined as the new state, i.e., the state characterized by the built-up area as the driving environment with a maximum permissible speed of 50 km/h.

Finally, an image is received and transmitted that maps a traffic sign 704 with a maximum permissible speed of 30 km/h. In order to calculate the first probability value, which is a measure of how probable it is that the received image maps this speed limit, a known transition probability value is used that indicates the probability with which a speed limit to a maximum of 30 km/h occurs within a built-up area with a maximum permissible speed of 50 km/h. Zones with a 30 km/h speed limit within a built-up area, for example within a residential area, occur very frequently, so that the associated transition probability value and the first probability value are high. The new output state is therefore (Built-up area, 30 km/h), i.e., the state characterized by the built-up area as the driving environment with a maximum permissible speed of 30 km/h.

Before the calculation of the first probability value, a provisional probability value can be calculated that also indicates the probability with which an image recorded at a specific time maps a specific traffic sign from the set of traffic signs.

The calculation of the provisional probability value can be performed according to a conventional matching method, for example by the method described in the introduction ("Traffic Sign Recognition") in which the images of recorded traffic signs are allocated to a specific traffic sign class on the basis of specific characteristic features and the recorded image is then allocated to a specific traffic sign within this traffic sign class on the basis of a feature that is class-specific to this specific traffic sign class. The matching process outputs a result, i.e., the provisional probability value, which indicates how reliably the recorded image shows the specific traffic sign from the traffic sign class.

Subsequently, a second probability value is then calculated that indicates a total probability, on the basis of the provisional probability value and the first probability value, for example by weighting the two values. For example, the traffic sign for which the highest provisional probability value was previously defined can first be used as the specific traffic sign in order to calculate the first probability value. In particular, only those traffic signs for which a provisional probability value was previously defined that exceeds a predefined threshold value can be used as specific traffic signs to calculate the first probability value.

A specific traffic sign from a set of traffic signs is then output, for example, as a recognized traffic sign if the second probability value determined for this specific traffic sign exceeds a predefined threshold value.

In combination with another known method, "Traffic Sign Fusion", the acceptance or non-acceptance of a specific traffic sign can be made dependent solely on the first probability value. It can also be made dependent on a combination of the first probability value with the results of the camera recognition and the map data. If, for example, the result of the camera recognition is a speed limit sign of 50 km/h, the traffic sign of the map is a speed limit sign of 80 km/h and the result of the present method is either a speed limit sign of 30 km/h, of 50 km/h or of 60 km/h (i.e., a high first probability value has been calculated in each case for these traffic signs), the sign with 50 km/h is output as the overall result, i.e., as the recognized traffic sign.

The previously known transition probability value can be stored in the memory 204. It is allocated to a sequence of traffic signs. These traffic signs map a real traffic event. The sequence of traffic signs can be determined manually by a person on the basis of observed, real traffic scenarios. These data are then input into the device 200.

Alternatively, the sequence of traffic signs can be obtained from a roadmap with traffic information stored on an external server, for example an "Open Street Map". This represents a simpler solution compared with that of the manual definition.

The sequence of traffic signs, either manually defined or based on the stored roadmap, can be stored in a text file. By known development systems, such as, for example, an open source library, for example the open source library MitLM, a file can be generated that in each case allocates a transition probability to individual sequences of traffic signs. This file can be stored in memory.

Compared with the described "Traffic Sign Recognition" method, the disclosed method offers the advantage that the result is independent from visibility conditions. Furthermore, the reliability of the method is not dependent on the quality of stored images with which the recorded images can be compared during the matching process. Furthermore, with the disclosed method, a reliable method for recognizing traffic signs can be provided using only a few training data, i.e., using few sequences of traffic signs that are observed or are obtained from the roadmap. Thus, in the case of "Traffic Sign Recognition", in order to guarantee the most reliable possible result even in poor visibility conditions, it is necessary for sufficient training data also to be provided for poor visibility conditions.

In the case of the variant of the two-stage method, the reliability of known methods can be improved. Traffic signs that were mistakenly recognized in the first step with the conventional methods, for example due to poor visibility conditions, can be recognized as improbable in the second step by considering the preceding states and can then be ignored. Specifically traffic signs that end a speed restriction, and are often incorrectly recognized by the known method, can be reliably recognized or excluded with the disclosed method on the basis of history. Furthermore, the training data of the known method can be reduced, since the reliability is increased by the second step.

One possible scenario is, for example, a journey within a built-up area in which a 12t traffic sign is observed. In a first step in which the received image data are matched with stored image data for the respective traffic signs of the respective traffic sign class, the closest match with the 120 km/h maximum speed limit sign is determined for the 12t traffic sign. In the second, subsequent step, the first probability value is calculated that indicates the probability with which the recorded image maps the 120 km/h traffic sign, i.e., on the basis of a transition probability value for the transition between a previous state characterized by a previously recorded image of a traffic sign and the presumed current state characterized by the 120 km/h traffic sign. However, since the 30 km/h maximum speed limit sign was observed in the built-up area before the 120 km/h maximum speed limit sign, the transition probability that the 120 km/h speed limit sign occurs within the built-up area after the 30 km/h speed limit sign is low. The second probability value determined by the provisional probability value and the first probability value and which indicates an overall probability is therefore low.

In combination with the other known method, "Traffic Sign Fusion", the acceptance or non-acceptance of a specific traffic sign can be made dependent solely on the first probability value or on a combination with the results of the camera recognition and the map data. This means that the definition and development of the time-consuming and costly hard-coded acceptance criteria are no longer required.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for recognizing traffic signs, comprising:
   receiving images of traffic signs from different locations at different times;
   defining a provisional probability value, indicating the probability with which an image received at the specific time maps a specific traffic sign from a set of traffic signs;
   calculating a first probability value that indicates the probability with which an image received at a specific time maps a specific traffic sign from a set of traffic signs, wherein the calculating is based on:
      at least one image of a traffic sign received before the specific time and characterizing an earlier state, and
      a previously known transition probability value that indicates the probability with which the specific traffic sign occurs following the earlier state;
   calculating a second probability value on the basis of the provisional probability value for a specific traffic sign from the set of traffic signs and the first probability value for the specific traffic sign, by weighting the provisional probability value with the first probability value; and outputting the specific traffic sign from the set of traffic signs based on the second probability value, wherein the previously known transition probability value is allocated to a sequence of traffic signs that map a real traffic event.

2. The method as claimed in claim 1, wherein, in calculating the first probability, the first probability value is first calculated for the specific traffic sign from the set of traffic signs for which a highest provisional probability value was defined in the preceding defining of the provisional probability value.

3. The method as claimed in claim 1,
wherein the outputting is based upon the set of traffic signs for which a highest second probability value was determined.

4. The method as claimed in claim 1, wherein the outputting is based upon the set of traffic signs if the first or second probability value determined for the specific traffic sign exceeds a predefined threshold value.

5. The method as claimed in claim 1, wherein, in calculating the first probability value, the earlier state is characterized by a traffic sign recognized by mapping an image recorded before the specific time.

6. The method as claimed in claim 1, wherein the first probability value is calculated based on a sequence of traffic signs recognized, before the specific time, by said traffic signs mapping images recorded before the specific time and in each case characterizing an earlier state.

7. The method as claimed in claim 1, wherein the sequence of traffic signs is obtained from a digital roadmap with traffic information.

8. The method as claimed in claim 1, wherein a recognized traffic sign is output to a driver assistance system.

9. The method as claimed in claim 1, wherein the method is carried out in autonomous driving of a vehicle.

10. A device for recognizing traffic signs, comprising a processor configured to:

receive images of traffic signs from different locations at different times;

define a provisional probability value, indicating the probability with which an image received at the specific time maps a specific traffic sign from a set of traffic signs;

calculate a first probability value that indicates the probability with which an image received at a specific time maps a specific traffic sign from a set of traffic signs, wherein the calculating is based on:
at least one image of a traffic sign received before the specific time and characterizing an earlier state, and
a previously known transition probability value that indicates the probability with which the specific traffic sign occurs following the earlier state;

calculate a second probability value on the basis of the provisional probability value for a specific traffic sign from the set of traffic signs and the first probability value for the specific traffic sign, by weighting the provisional probability value with the first probability value; and output the specific traffic sign from the set of traffic signs based on the second probability value, wherein the previously known transition probability value is allocated to a sequence of traffic signs that map a real traffic event.

11. The device as claimed in claim 10, wherein the processor is configured so that, in calculating the first probability, the first probability value is first calculated for the specific traffic sign from the set of traffic signs for which a highest provisional probability value was defined in the preceding defining of the provisional probability value.

12. The device as claimed in claim 10, wherein the processor is configured so that, in the calculation of the first probability value, the earlier state is characterized by a traffic sign recognized by mapping the image recorded before the specific time.

13. The device as claimed in claim 10, further comprising a memory in which the previously known transition probability value and a sequence of traffic signs allocated to the transition probability value and mapping the real traffic event are stored.

14. The device as claimed in claim 13, wherein the sequence of traffic signs is obtained from a roadmap with traffic information stored on an external server.

15. The device as claimed in claim 10, wherein the device forms part of a driver assistance system of a vehicle.

16. A vehicle, comprising the device as claimed in claim 10.

17. A non-transitory computer-readable medium storing a program with program code, which, when executed on a processor-controlled computer, carries out the method as claimed in claim 1.

* * * * *